Figure 1:
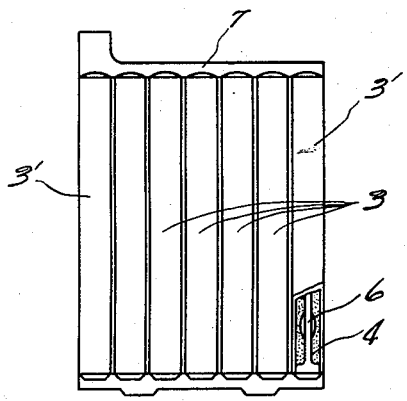

Aug. 12, 1958     MASAO YAMAURA     2,847,496

GLASS-FIBER-TUBE TYPE LEAD-ACID STORAGE BATTERY PLATE

Filed Oct. 5, 1955     2 Sheets-Sheet 1

INVENTOR
MASAO YAMAURA

By Watson, Cole, Grindle & Watson
ATTORNEYS

Aug. 12, 1958  MASAO YAMAURA  2,847,496
GLASS-FIBER-TUBE TYPE LEAD-ACID STORAGE BATTERY PLATE
Filed Oct. 5, 1955  2 Sheets-Sheet 2
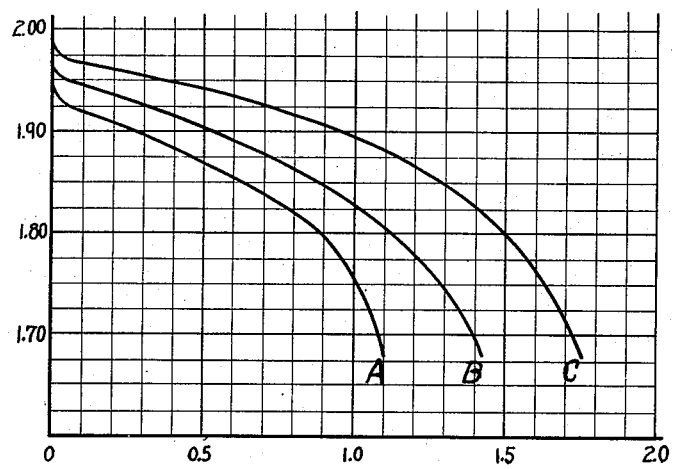
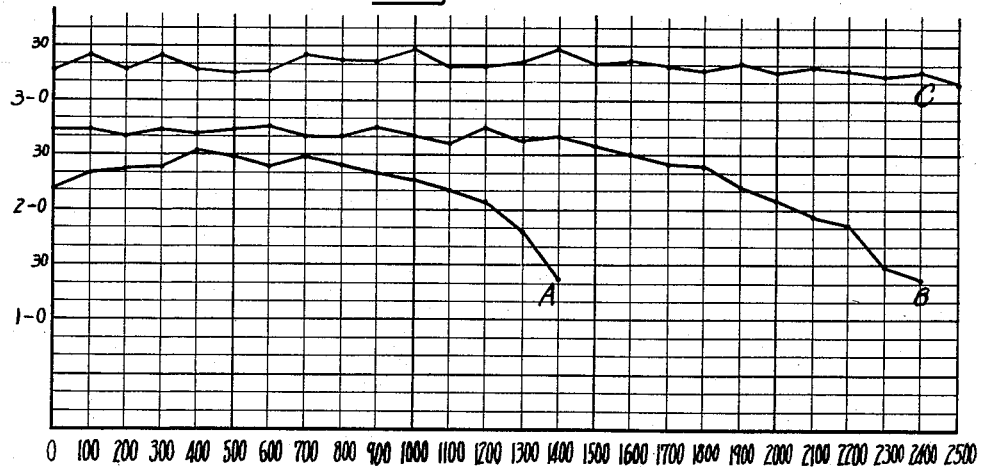
INVENTOR
MASAO YAMAURA

United States Patent Office 2,847,496
Patented Aug. 12, 1958

2,847,496

GLASS-FIBER-TUBE TYPE LEAD-ACID STORAGE BATTERY PLATE

Masao Yamaura, Takatsuki-City, Japan

Application October 5, 1955, Serial No. 538,659

3 Claims. (Cl. 136—148)

The positive plate of the ironclad type lead-acid storage battery, in the most common use at present, is made up of lead-alloy spines, hard rubber tubes with numerous fine slots each measuring about 0.1 to 0.3 mm. wide into which the spines are inserted, and the active material filled into the spaces between the spines and the tubes. This type of positive plate is, however, defective intrinsically in that the active material will gradually fall down because the aperture of these "fine" slots is extremely larger than the size of particles of the filled active material. To overcome this defect, a modified ironclad positive plate consisting principally of acid-resisting anti-oxidation glass-fiber filaments had been proposed to make the apertures smaller. (The positive plate made up of such tubes will hereafter be called the "glass-fiber-tube plate.") This invention relates to an improvement of the above-mentioned glass-fiber-tube plate.

The glass-fiber-tube plate may be classified depending on materials used for the filaments, modes of fabricating filaments into mats and tubes, whether or not any adhesive agent is used for reinforcement, etc. Reference is made to U. S. Patent Nos. 2,168,366, 2,176,428, 2,195,211, 2,195,212 and 2,305,121.

In those types where glass-filament yarns are woven or braided into cloth, the material filaments are tied up in bundles to make such yarns, and therefore the electrolyte is hard to freely pass through the filaments comprising individual yarns because of increased electric resistance of the tube. As a consequence, the battery capacity, particularly where heavy draining of electric current is required, is that much reduced. A special complicated machine is required to weave or braid the filaments into cloth and therefore production cost is high. Furthermore, the filaments have to be extremely bent so as to make woven or braided cloth, inevitably requiring very fine filaments to be used, and thus create wider per-unit reaction surface liable to be corroded by the electrolyte to a not negligible extent, resulting in shorter battery life. One of the objectives sought in this invention is to remove this inherent defect by doing away with preparing yarns, weaving or braiding them into cloth.

According to certain methods used in the above-referred U. S. patents, particularly No. 2,168,366, a tube is made up of spirally rolled glass-fiber strips in the form of fine fibers matted or felted (known in the trade as "glass wool") and impregnated with a binder such as vulcanized rubber or vulcanite. In this method, however, a spiral seam extends over the whole length of the outer surface of the tube. It is feared, therefore, that not only any rupture in the seam will allow active material to shed out more than normal, while the battery is in use, but also that battery life will be inevitably shorter because the adhesive rubber binder used is subject to chemical decomposition due to anodic corrosion and deterioration. Another objective of this invention is to use electrochemically stabler synthetic resins as adhesive agent and prolong the tube life by doing away with spirally rolling glass-fiber strips and the use of rubber binder.

In the above-referred U. S. patents, particularly No. 2,305,121, it is also proposed to make the tube from glass-fiber yarns or threads by weaving, braiding, or other textile fabricating operations and by impregnating them with synthetic resins. If, however, the yarns made of filaments are woven or braided into cloth, electric resistance of the tube, as stated above, will be high. In addition to that, if the yarns are further impregnated with synthetic resins, electric resistance of the tube will be all the more increased, and the battery capacity will become smaller. To obviate this defect as much as possible, the patent encourages using a sufficiently dilute solution of toluene or other aromatic hydrocarbon for impregnating purposes. This proposition still does not solve the high electric resistance of the tube because intrinsically high electric resistance of the woven or braided cloth is hard to be reduced and compensated owing to difficulty in diluting viscosity of the solution to the extremes. Furthermore, if concentration of the resin is too much reduced, the tube cannot be given sufficient rigidity owing to reduced amount of the impregnating resin. Still further, the openings between the woven or braided yarns are comparatively large, and therefore it is difficult, as also admitted in the patent, to prevent any sifting or "shedding" of particles of the active material through a coarser meshed fabric tube. To improve this point, the patent urges using a sleeve of some suitable sheet material, such as paper or more preferably, glass-fiber paper. Contrary to these various proposals, this invention proposes to obtain tubes excellent in performance and free from all the above defects without weaving or braiding, or using any highly viscous synthetic resin solution like such an organic solvent as hydrocarbon, and nevertheless improve the quality of the positive plate made by the tubes. The nature of the invention will be readily understood from the following description when read in connection with the accompanying drawings, and the novel features will be particularly pointed out in the appended claims.

Figure 3:
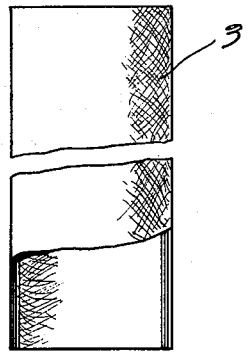
Figure 2:
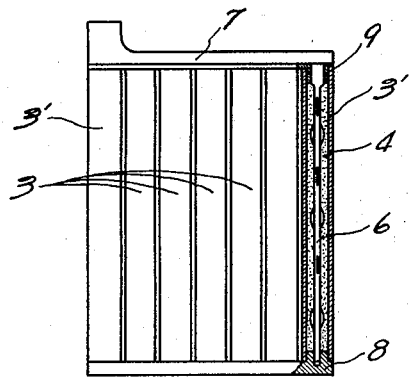
Figure 4:
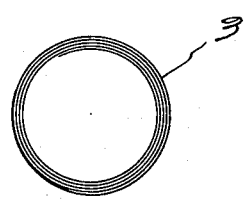
Figure 6:
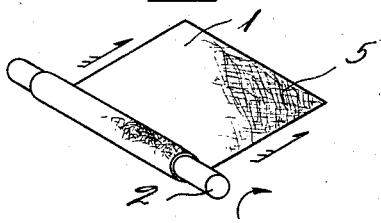
Figure 5:
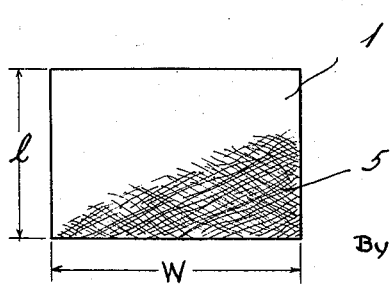

Referring to the accompanying drawings:

Fig. 1 is a partial sectional view of the battery plate comprising porous tubes and made in accordance with my invention; Fig. 2 is a modification of the plate; Fig. 3 is a partial sectional magnified elevation on a larger scale of the tube; Fig. 4 is a plan of Fig. 3; Fig. 5 is a rectangular glass mat for a tube sprayed with acid-resisting adhesive; Fig. 6 illustrates a step in the process of manufacturing the tube and shows a rectangular fibrous glass mat wound on a mandrel; Fig. 7 shows comparative discharge curves at heavy current for the positive plate made in accordance with this invention and that of the conventional types; Fig. 8 shows curves of the comparative life cycles for the positive plate made in accordance with this invention and that of the conventional types.

To begin with, the glass-fiber mat, as material of the tube, is made of glass-fiber filaments. The glass filaments used are almost similar to those in common use for a retainer mat in any conventional storage battery, but finer ones are more often required in view of the fact that each of them is to be bent so as to be rolled into a tube. They are about 10 microns in diameter. In case of making a tube of extremely smaller diameter, filaments measuring about 5–10 microns in diameter are sometimes used. The mat is made of glass-fiber filaments laid at oblique angles with each other, and a piled-up thickness of between 0.1 and 0.2 mm. is selected in most of the cases. When these individual filaments are laid almost at a right angle with each other, the mats thus obtained have an advantage in that they are isotropic, mechanically strong and even in thickness. Furthermore, if the mat is cut into rectangular sizes and the filaments are brought to ½ of a right angle to the four sides of such rectangles, each of the filaments are automatically found almost at ½ of a right angle to the axis of the manufactured tube. Consequently, the mat can resist against, and evenly distribute, the pressure exerted in the direction of its axis when filling active material into the tube as well as against the internal pressure wrought by expansion of the active material when the storage battery is in actual use. Although it is necessary to apply an adhesive agent to a minimum so that the mat may maintain its shape, a very dilute emulsion or suspension of synthetic resin, or a soluble material such as emulsion or suspension, glue, agar-agar or starch, or a mixture of any two of them in an appropriate quantitative ratio may be used. In any case only a very small quantity of the adhesive agent is necessary and sufficient for the fabrication of the sheet mat because it is not used in shaping the tube. The adhesive agent used is generally less than 20 percent of the weight of the glass-fiber filaments. The agent is applied over the mat by spraying and dried. Then the mat is cut into required rectangular sizes as shown in Fig. 5, "l" with its width "W" slightly longer than the length of a tube to be made. Its length ("l" in Fig. 5) has to be long enough to wind around the mandrel several times (preferably over five times). Then the adhesive agent is applied to the mat either by soaking or by spraying. It may be in some cases sprayed all over the surface of the mat 1, but usually 1/10–1/2 of the surface space is left unsprayed in the direction of the length so that the mat 1 can be easily rolled around a mandrel 2.

In that case it is very important to select right species and quantity of the adhesive agent to be used, because it has a vital bearing upon the performances of the processed positive plate. Thoroughgoing researches were carried out on this point concerning this invention. In consequence of a tube of long life and of excellent property was successfully developed. The adhesive agent used should be of acid-resisting and anti-oxidation property and also should have sufficient adhesiveness to glass-fiber filaments. There are numerous kinds of natural and synthetic materials of this property, but those natural materials seldom are of even quality. Therefore, it is better to use those synthetic or artificial materials. Especially suitable materials are found among polymerized or condensed synthetic resins consisting of molecules having large molecular weight such as phenolformaldehyde resin, polyvinyl chloride resin, polyvinylidene chloride resin, polystyrene resin, acrylate resin, etc. It is, however, not insured that tubes of similar quality can be obtained from any of the resins. Phenol-formaldehyde resin, for instance, is unsuitable for making the tube. The reason for this is: at the A-stage the glass-fiber filaments of which the tube is made are impregnated with this resin in the condensed form regardless of its solubility in water or alcohol, then they are heated up to 130–180 degrees C. to obtain an insoluble, stable, and highly condensed material. Defects accompanying this process are (1) special facilities will be required to heat the resin to high degrees, because any simple heating method by steam cannot be employed; (2) the properties of the tube may be directly affected, if in the case of mass production the resin is not heated enough for some reason or other, because of the fact that the resin can only get stabilized after it is heated; (3) the battery capacity may decrease, if phenolformaldehyde or any other water-repellent material is used, because sulphuric acid will not freely pass through the tube wall which on the contrary should allow free access of electrolyte to the active material retained inside. To remove this defect, it is proposed to use a wetting agent together with the resin, but the agent will decompose itself and become ineffective, because it cannot stand the high temperature while curing the resin; (4) it is feared, while the battery is in use, that the tube will crack and break by the force exerted from inside through expansion of active material retained in the tube, because phenol-formaldehyde resin is brittle at the C-stage, resulting in shorter battery life.

Phenol-formaldehyde and other thermosetting resins, as stated above, are not suitable for use. After conducting researches on numerous adhesive agents, I discovered that water-suspension of a polymerized thermo-plastic resin is most suitable as an adhesive agent. For instance, water-suspension of the copolymerized resin of vinyl chloride (30–70%) and vinylidene chloride (70–30%) is most suitable. Its polymerization degree usually is between 200 and 300. To suspend it in water, a surface-active suspension agent should be used as in the usual way. This water suspension should include 10–60% (preferably 40%) of the resin, although the percentage will vary according to the properties desired for a specific tube. Each particle of the polymerized resin in the water-suspension usually is 0.1 micron in diameter. When this water suspension of polymerized resin particles is used, no further substantial chemical reaction will take place during the manufacturing process of the tubes, because the resin is already a polymerized material. Therefore, main points of advantage in this invention, it may be summarized, are: there is no fear that the mass production of the tubes will result in qualitative unevenness as against the case where phenol-formaldehyde resin is used; the water suspension of polymerized resin particles are remarkably less viscous than the solution of the same resin dissolved in organic solvent, and therefore the adhesive agent concentrates mainly on crosspoints (5 in Fig. 5 and Fig. 6) of the fiber filaments, and provides satisfactory rigidity to the filament layers without clogging the pores; there is no fear of the wetting agent being decomposed because it need not be heated for a long time at a higher temperature; the production cost of tubes is low partly because water is used instead of an organic solvent and partly because the processing method of tubes is quite simple.

The mat 1 thus made of glass-fiber filaments and impregnated with the adhesive agent is wound several times around a mandrel 2. If in this case a certain tension is exerted in the direction of the arrow-head (Fig. 6), the porosity of the tube will be kept constant, partly because the volume of a given weight of glass-fiber mat will be kept constant and partly because the degree of surplus resin to be squeezed out will be kept constant. Next, the water used as suspension agent is allowed to evaporate while passing through a drying-chamber using steam, infra-red rays, electric heater, etc. Then the resin particles will concentrate on the surface of glass-fiber filaments and their crosspoints. After the tube is dried, the mandrel 2 is removed. In that case, however, the inside surface of the tube and the mandrel tend to stick to each other. Thereafter it is usually difficult to remove the mandrel 2 from the wound tube. To remove it easily, a soluble material like starch is applied beforehand to the surface of the mandrel or the inner surface of the glass-fiber mat and then dried. If then the mat rolled around the mandrel is put in hot water for a short time, the soluble material is softened and partly dissolved, and the mandrel is easily removed from the processed tube. The tube, after removed from the mandrel, is generally cut exactly to a required length. The cut tubes are sometimes subjected to another heating process at a higher temperature than in the preceding process.

Water-suspended particles of the copolymerized resin of vinyl chloride and vinylidene chloride, as stated above, make one of the most suitable adhesive agents. Reasons for this are: they contain a chemically stabilized resin, as stated above; the suspension is not so viscous as to clog the pores; and the cost is low. Therefore, anything which will satisfy these conditions may replace water-suspended particles of the copolymerized resin of vinyl chloride and vinylidene chloride. It is, for instance, possible to use the emulsion or water suspension of polystyrene-acryl polymer, acryl-vinyl polymer, acryl-styrene polymer, or vinyl-chloride polymer.

The adhesive agent should in principle be applied to glass-fiber filaments in a plain mat. It is, in some other cases, applied to them in a tube-shape mat. As a supplementary agent to shape the mat into a tube may be used soluble materials, such as starch, glue and agar-agar, or a mixed solution of any of them and a resin. In that case the adhesive agent may also be applied by immersing or spraying it after shaping the mat into a tube (in the condition of either the mat being rolled around the mandrel or the mandrel being removed).

The method of processing glass-fiber-tube plates with the tubes made in this way is the same as that of processing ironclad storage battery plates with the conventional hard rubber tubes having numerous slots. In other words, the tubes 3 are inserted into the electro-conductive spines 6 that are electrically connected with the upper bar 7; material powder 4 for active material, such as lead oxides, litharge, minium, etc. is then filled into the space between the tubes and the spines and the lower bar is fitted to the lower edges of the tubes to prevent the filled active powder material from falling out. In this connection Fig. 1 shows a type of the lower bar molded integrally with the inner spines of a number of tubes making up one plate by molten lead alloy after the active material is filled inside. Fig. 2 is one modification of Fig. 1 in which acid-resisting insulating material such as semi-hard rubber, polyethylene, etc. is used for the lower bar. The part shown as (9) in Fig. 2 is a device to protect the tubes and prolong the plate life by filling out studs made of such insulating acid-resisting material as semi-hard rubber, polyethylene, etc. at the juncture between the upper edges of the spines and the upper bar. The tube made according to this invention is as porous at this location as at any other points of the tube wall (in the case of a hard rubber tube having numerous slots, no slots at this point are provided so as to prevent corrosion of the spine enclosed inside). The studs are used here because it was discovered after researches that the glass-fiber tube also is more likely to break at this point, if without such studs, than at any other points on account of the corrosion and the resulting expansion of the spines while the battery is in use.

When fitting the tubes 3 to the spines, the tubes of less porosity than other intermediate tubes are sometimes used at both ends of the plate. The reason for this is: in terms of current distribution, the tubes at both ends are subjected to higher utilization of active material filled in them than other intermediate tubes, and a higher degree of expansion and contraction taking place through repeated charge and discharge causes earlier deterioration of the end tubes. Therefore, by reducing porosity of the end tubes, utilization rate of the filled active material balances approximately with that of other intermediate tubes owing to increased electric resistance, and the earlier deterioration of the end tubes is thus effectively prevented. Another objective sought is to minimize damage on the plate while handling. To manufacture such tubes of lesser porosity, it is recommended to increase volume of the adhesive agent to be applied on the tubes.

It can easily be understood from the aforementioned explanation that the capacity and durability of the storage battery with the positive plate processed with the glass-fiber-tubes are superior to those of the conventional storage battery plate having hard rubber tubes with numerous slots on the tube surface. The storage battery made according to this invention excellently compares in performance and property with that having the tubes made of woven or braided filament cloth. Especially the pores of each of the glass-fiber-tubes are very fine and numerous. This serves in particular to increase the battery capacity at a high-rate discharge and maintain high average discharge voltage. The table below compares the battery capacities at various discharge rates and their average voltages during discharge. Cell A is the conventional ironclad storage battery with the positive plate of hard rubber tubes provided with numerous slots; cell B is the storage battery with the positive plate of tubes made of woven or braided filament cloth; cell C is the storage battery with the glass-fiber-tube plate under this invention. With the exception of processing methods of the tubes that are different from each other, the three storage batteries are tested under the same conditions, for instance, in the length and thickness of each positive plate, the number of tubes used, the sizes of each positive plate, the sizes of and the distance between each positive and negative plates, and volume and specific gravity of the electrolyte. Each of the storage batteries used in the experiments tabulated below and those shown in Fig. 7 and Fig. 8 measures the same dimension of 71 mm. long, 156 mm. wide, and 350 mm. high.

| Remarks | when discharged at— | | | | | | | |
|---|---|---|---|---|---|---|---|---|
| | 9.6 A. | | 16.8 A. | | 24.7 A. | | 54.5 A. | |
| | Capacity (AH) | Average Voltage (V) | Capacity (AH) | Average Voltage (V) | Capacity (AH) | Average Voltage (V) | Capacity (AH) | Average Voltage (V) |
| Cell Symbols: | | | | | | | | |
| A | 115.0 | 1.960 | 97.0 | 1.935 | 86.0 | 1.925 | 60.0 | 1.845 |
| B | 132.0 | 1.965 | 114.0 | 1.940 | 98.0 | 1.929 | 76.0 | 1.859 |
| C | 142.0 | 1.973 | 128.0 | 1.955 | 115.0 | 1.940 | 95.0 | 1,880 |

Fig. 7 shows the characteristic discharge curves for cells A, B and C when discharged at 54.5 amperes. The abscissa shows discharge hours (unit: hour), and the ordinate the terminal voltage (unit: volt). The plate processed according to this invention, as seen in the above table and Fig. 7, is superior in performance to any other plates of the different construction. Especially excellent is its discharge characteristics at a high-rate discharge. This is made possible by reduced electric resistance due to extremely numerous unclogged microscopic apertures evenly distributed on the tube surface. Fig. 8 shows the durability in terms of discharge cycles of plates of the above three types. The abscissa shows the number of charge and discharge cycles, and the ordinate the capacities (unit: hour). For this test the three cells were connected in series, discharged at 33 amperes for 2 hours, then charged at 33 amperes for 2.5 hours, and repeated. The capacity of the glass-fiber-tube plate processed according to this invention not only is larger than that of any other conventional plates as shown on the diagram, but also is maintained still as high after the 2500th cycle as in the initial period of the discharge cycles. Furthermore this experiment is not yet finished but still going on. It is presumed that the plate will be usable for several thousand cycles until its capacity is reduced by half. None of the conventional lead-acid storage battery plates have such long life expectancy as this plate. In a word, the plate processed according to this invention has a large capacity and very long life expectancy unattainable in any other conventional types.

What I claim is:

1. A method for making a porous tube for a lead acid storage battery positive plate comprising the steps of laying glass filaments at right angles with each other to form a mat, cutting said mat into required rectangular sizes with its width equal to the length of the tube to be rolled, rolling said mat several times around a mandrel, impregnating said rolled mat with a water suspension of copolymerized vinyl chloride-vinylidene chloride, the polymerization degree of said vinyl chloride-vinylidene chloride being in the range of 200 to 300, drying said rolled mat and cutting said rolled mat into the required length.

2. A method for making a porous tube for a lead acid storage battery positive plate in accordance with claim 1, wherein the water suspension includes a copolymer of between 30% and 70% of vinyl chloride and between 70% and 30% of vinylidene chloride.

3. A method for making a porous tube for a lead acid storage battery positive plate according to claim 1 comprising the steps of impregnating the tubes to be used as end tubes of the plate to a greater degree than the tubes to be used as intermediate tubes of the plate whereby the porosity of the end tubes is less than that of the intermediate tubes.

References Cited in the file of this patent

UNITED STATES PATENTS

| | | |
|---|---|---|
| 1,243,369 | Willard | Oct. 16, 1917 |
| 2,168,366 | Slayter | Aug. 8, 1939 |
| 2,176,428 | Kershaw | Oct. 17, 1939 |
| 2,195,211 | Hall | Mar. 26, 1940 |
| 2,305,121 | Wheat | Dec. 15, 1942 |
| 2,420,456 | White | May 13, 1947 |
| 2,609,407 | Rowsell | Sept. 2, 1952 |
| 2,653,986 | Philipps | Sept. 29, 1953 |
| 2,806,076 | Yamaura et al. | Sept. 10, 1957 |

FOREIGN PATENTS

| | | |
|---|---|---|
| 561,442 | Great Britain | May 19, 1944 |